(12) United States Patent
Wu (10) Patent No.: US 8,391,871 B2
(45) Date of Patent: Mar. 5, 2013

(54) METHOD OF HANDLING PROXIMITY INFORMATION TRANSMISSION AND RELATED COMMUNICATION DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 0 days.

(21) Appl. No.: 12/911,747

(22) Filed: Oct. 26, 2010

(65) Prior Publication Data

US 2011/0105127 A1 May 5, 2011

Related U.S. Application Data

(60) Provisional application No. 61/286,396, filed on Dec. 15, 2009, provisional application No. 61/256,317, filed on Oct. 30, 2009.

(51) Int. Cl.
 *H04W 36/00* (2009.01)
(52) U.S. Cl. ......... 455/438; 455/436; 455/434; 370/331
(58) Field of Classification Search ............... 370/331, 370/332, 338; 455/438, 434, 446
 See application file for complete search history.

(56) References Cited

U.S. PATENT DOCUMENTS

| | | | |
|---|---|---|---|
| 7,751,778 B1 | 7/2010 | Ngan | |
| 8,086,236 B2 * | 12/2011 | Wu | 455/436 |
| 8,116,776 B1 * | 2/2012 | Jagadeesan et al. | 455/438 |
| 8,165,590 B2 * | 4/2012 | Gunnarsson et al. | 455/446 |
| 8,185,116 B2 * | 5/2012 | Wu | 455/436 |
| 8,204,481 B2 * | 6/2012 | Kone | 455/411 |
| 8,265,033 B2 * | 9/2012 | Gunnarsson et al. | 370/331 |
| 2002/0142774 A1 | 10/2002 | Saint-Hilaire | |
| 2008/0069053 A1 * | 3/2008 | Kim et al. | 370/332 |
| 2008/0089291 A1 | 4/2008 | Song | |
| 2008/0139207 A1 | 6/2008 | Son | |
| 2009/0011790 A1 | 1/2009 | Lee | |
| 2010/0323633 A1 | 12/2010 | Pani | |
| 2011/0098048 A1 | 4/2011 | Zhang | |
| 2011/0105083 A1 | 5/2011 | Wu | |
| 2011/0179168 A1 | 7/2011 | Nylander | |
| 2011/0206011 A1 * | 8/2011 | Ishida et al. | 370/331 |
| 2012/0270552 A1 * | 10/2012 | Shi et al. | 455/438 |

FOREIGN PATENT DOCUMENTS

| | | |
|---|---|---|
| CN | 101287294 A | 10/2008 |
| EP | 2317795 A1 | 5/2011 |
| JP | 2009111624 A | 5/2009 |
| JP | 201197589 A | 5/2011 |

(Continued)

OTHER PUBLICATIONS

3GPP TS 25.367 V9.1.0 3rd Generation Partnership Project; Technical Specification Group Radio Access Network; Mobility Procedures for Home NodeB; Overall Description; Stage 2 (Release 9), Sep. 2009.

(Continued)

*Primary Examiner* — Shard Rampuria
(74) *Attorney, Agent, or Firm* — Winston Hsu; Scott Margo (57) ABSTRACT

A method of handling proximity information transmission for a mobile device in a wireless communication system is disclosed. The method comprises initiating a handover procedure triggered by receiving a handover command or an radio resource control (RRC) connection re-establishment procedure, detecting a closed subscriber group (CSG) cell of a whitelist in the mobile device, wherein the whitelist provides a list of accessible CSG cells for the mobile device, and determining whether to perform the proximity information transmission according to an RRC message received from a network of the wireless communication system, wherein the RRC message includes a configuration of the proximity information transmission.

10 Claims, 6 Drawing Sheets

FOREIGN PATENT DOCUMENTS

| | | |
|---|---|---|
| JP | 201197591 A | 5/2011 |
| KR | 100677460 B1 | 2/2007 |
| KR | 1020070060225 A | 6/2007 |
| KR | 1020080032960 A | 4/2008 |
| KR | 1020090022567 A | 3/2009 |
| WO | 2009009498 A1 | 1/2009 |
| WO | 2009044317 A2 | 4/2009 |
| WO | 2009117658 A1 | 9/2009 |
| WO | 2009128642 A2 | 10/2009 |

OTHER PUBLICATIONS

3GPP TS 25.331 V9.0.0 3rd Generation Partnership Project; Technical Specification Group Radio Access Network; Radio Resource Control (RRC); Protocol Specification (Release 9); p. 1-506, Sep. 2009.

3GPP R2-096293 "Capturing agreements on inbound mobility", Oct. 2009.

Office action mail on Oct. 24, 2011 for the Korean application No. 10-2010-0105879, filing date Oct. 28, 2010, p. 1-5.

3GPP TS 36.331 V9.0.0 3rd Generation Partnership Project; Technical Specification Group Radio Access Network; Evolved Universal Terrestrial Radio Access (E-UTRA) Radio Resource Control (RRC); Protocol specification (Release 9), Sep. 2009.

3GPP R2-097445 Slight revision of baseline CR capturing agreements on inbound mobility, Nov. 2009.

3GPP R2-097466 Introduction of network ordered SI reporting, Nov. 2009.

Office action mailed on Jan. 19, 2012 for the U.S. Appl. No. 12/910,879, filed Oct. 25, 2010, p. 1-19.

Panasonic, Configuration for proximity indication in measurement report, 3GPP TSG RAN WG2#67bis, R2-095606, Oct. 12-16, 2009, Miyazaki, Japan.

Motorola, et al, Draft CR capturing HeNB inbound mobility agreements, 3GPP TSG-RAN WG2 Meeting #67, R2-095342, Aug. 24-28, 2009, Shenzhen, China.

NTT Docomo, Inc., CSG inbound handover-proximity indication, 3GPP TSG-RAN WG2 #67bis, Tdoc-R2-096019, Miyazaki, Japan, Oct. 12-16, 2009.

Office action mailed on Feb. 14, 2012 for the Japanese application No. 2010-243897, filing date Oct. 29, 2009, p. 1-3.

Office action mailed on Jun. 12, 2012 for the Japanese application No. 2010-245371, filed Nov. 1, 2010, pp. 1-3.

Office action mailed on May 29, 2012 for the Korean application No. 10-2010-0105879, filed Oct. 28, 2010, p. 1-3.

Office action mailed on Oct. 26, 2012 for the U.S. Appl. No. 12/910,879, filed Oct. 25, 2010, p. 1-18.

Alcatel-Lucent, Inbound Mobility Proximity report options, 3GPP TSG-RAN WG2 Meeting #67, R2-094256, Shenzhen, China, Aug. 24-28, 2009.

Office action mailed on Oct. 16, 2012 for the Japanese application No. 2010-245371, filing date Nov. 1, 2010, pp. 1-3.

Office action mailed on Dec. 5, 2012 for the China application No. 201010536145.5, filing date Oct. 29, 2010.

Office Action mailed on Dec. 18, 2012 for the Korean application No. 10-2010-0107111, filing date Oct. 29, 2010.

* cited by examiner

METHOD OF HANDLING PROXIMITY INFORMATION TRANSMISSION AND RELATED COMMUNICATION DEVICE

CROSS REFERENCE TO RELATED APPLICATIONS

This application claims the benefit of U.S. Provisional Application No. 61/286,396, filed on Dec. 15, 2009 and entitled "Methods to transmit proximity indication information in wireless communications system", and U.S. Provisional Application No. 61/256,317, filed on Oct. 30, 2009 and entitled "Methods to transmit proximity indication information in wireless communications system" the contents of which are incorporated herein in their entirety.

BACKGROUND OF THE INVENTION

1. Field of the Invention

The application relates to a method utilized in a wireless communication system and a communication device thereof, and more particularly, to a method of handling proximity information transmission in a wireless communication system and a related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

In the LTE system, a UE supporting a closed subscriber group (CSG) feature can transmit proximity information to the network for triggering inbound mobility (namely handover) to a CSG/hybrid cell. The UE supporting the CSG feature has a CSG whitelist which contains one or more CSG identities associated with CSG cells on which the UE is allowed access. The CSG cell is associated with a small coverage base station which may be deployed for magnificent advantages, such as the high bandwidth wireless internet access in the home and office, and efficient and cost-effective capacity solution for indoor coverage, whereas the hybrid cell is accessed as a CSG cell by a UE whose CSG whitelist contains a CSG identity of the cell and as a normal cell by all other UEs.

As to an operation of the inbound mobility, the proximity information is sent to the network (i.e. the E-UTRAN, an eNB, or a base station) when the UE detects that it is close to a CSG cell in its CSG whitelist. The network configures the UE with a measurement configuration including a measurement gap if needed after the proximity information is received. Meanwhile, the UE reads the system information of the detected CSG cell for obtaining the CSG identity of the detected CSG cell, and checks whether the CSG identity is in the CSG whitelist. If the CSG identity is in the CSG whitelist indeed, the UE performs the measurement to the detected CSG cell, so as to generate a measurement report to the network for a handover preparation. Thus, the network determines whether to handover the UE to the CSG cell according to the measurement report.

In addition, the UE is allowed to transmit the proximity information to the network when the network indicates that the inbound mobility to CSG/hybrid cells is support. For example, the UE initiates an RRC connection reconfiguration request procedure to transmit the proximity information to the network in an "RRCConnectionReconfigurationRequest" message when an "RRCConnectionReconfiguration" message, which includes a field of "inboundHO-Support" indicating that a first eNB presently serving the UE supports the inbound mobility to CSG/hybrid cells, is received from the network. However, the UE may meet a radio link failure and performs an RRC connection re-establishment procedure to a second eNB. Meanwhile, the UE detects that it is close to a CSG cell in the CSG whitelist, and sends the "RRCConnectionReconfigurationRequest" message to the second eNB. Nevertheless, the second eNB may not support the inbound mobility to CSG/hybrid cells. The "RRCConnectionReconfigurationRequest" message may confuse the second eNB or make the second eNB system failure because the second eNB is unable to process the "RRCConnectionReconfigurationRequest" message.

Furthermore, the abovementioned situation may occur in a universal mobile telecommunications system (UMTS). For example, the UE provides a serving radio network controller (SRNC) with the proximity information when it is near a CSG/hybrid cell whose CSG identity is in the UE's CSG whitelist. Due to similar behavior in the UMTS system, the foregoing problems arise as well.

SUMMARY OF THE INVENTION

The application discloses a method of handling proximity information transmission in a wireless communication system and a related communication device in order to solve the abovementioned problems.

A method of handling proximity information transmission for a mobile device in a wireless communication system is disclosed. The method comprises initiating a handover procedure triggered by receiving a handover command or an radio resource control (RRC) connection re-establishment procedure, detecting a closed subscriber group (CSG) cell of a whitelist in the mobile device, wherein the whitelist provides a list of accessible CSG cells for the mobile device, and determining whether to perform the proximity information transmission according to an RRC message received from a network of the wireless communication system, wherein the RRC message includes a configuration of the proximity information transmission.

A method of handling proximity information transmission for a mobile device in a wireless communication system is disclosed. The method comprises initiating a handover procedure triggered by receiving a handover command or a radio resource control (RRC) connection re-establishment procedure, detecting a closed subscriber group (CSG) cell of a whitelist in the mobile device, wherein the whitelist provides a list of accessible CSG cells for the mobile device, and after the handover procedure or the RRC connection re-establishment procedure is completely performed, performing the proximity information transmission when a RRC message including a configuration of the proximity information transmission is received from a network of the wireless communication system.

A method of handling proximity information transmission for a mobile device in a wireless communication system is disclosed. The method comprises receiving a radio resource control (RRC) message including a configuration of the proximity information, from a network of the wireless communication system, initiating a handover procedure triggered by receiving a handover command or a RRC connection re-establishment procedure, and disabling the proximity information from transmission.

A mobile device of a wireless communication system for handling proximity information transmission is disclosed. The mobile device comprises means for initiating a handover procedure triggered by receiving a handover command or an radio resource control (RRC) connection re-establishment procedure, means for detecting a closed subscriber group (CSG) cell of a whitelist in the mobile device, wherein the whitelist provides a list of accessible CSG cells for the mobile device, and means for determining whether to perform the proximity information transmission according to an RRC message received from a network of the wireless communication system, wherein the RRC message includes a configuration of the proximity information transmission.

A mobile device of a wireless communication system for handling proximity information transmission is disclosed. The mobile device comprises means for initiating a handover procedure triggered by receiving a handover command or a radio resource control (RRC) connection re-establishment procedure, means for detecting a closed subscriber group (CSG) cell of a whitelist in the mobile device, wherein the whitelist provides a list of accessible CSG cells for the mobile device, and after the handover procedure or the RRC connection re-establishment procedure is completely performed, means for performing the proximity information transmission when a RRC message including a configuration of the proximity information transmission is received from a network of the wireless communication system.

A mobile device of a wireless communication system for handling proximity information transmission is disclosed. The mobile device comprises means for receiving a radio resource control (RRC) message including a configuration of the proximity information, from a network of the wireless communication system, means for initiating a handover procedure triggered by receiving a handover command or a RRC connection re-establishment procedure, and means for disabling the proximity information from transmission.

These and other objectives of the present invention will no doubt become obvious to those of ordinary skill in the art after reading the following detailed description of the preferred examples that are illustrated in the various figures and drawings.

DETAILED DESCRIPTION

Figure 1:
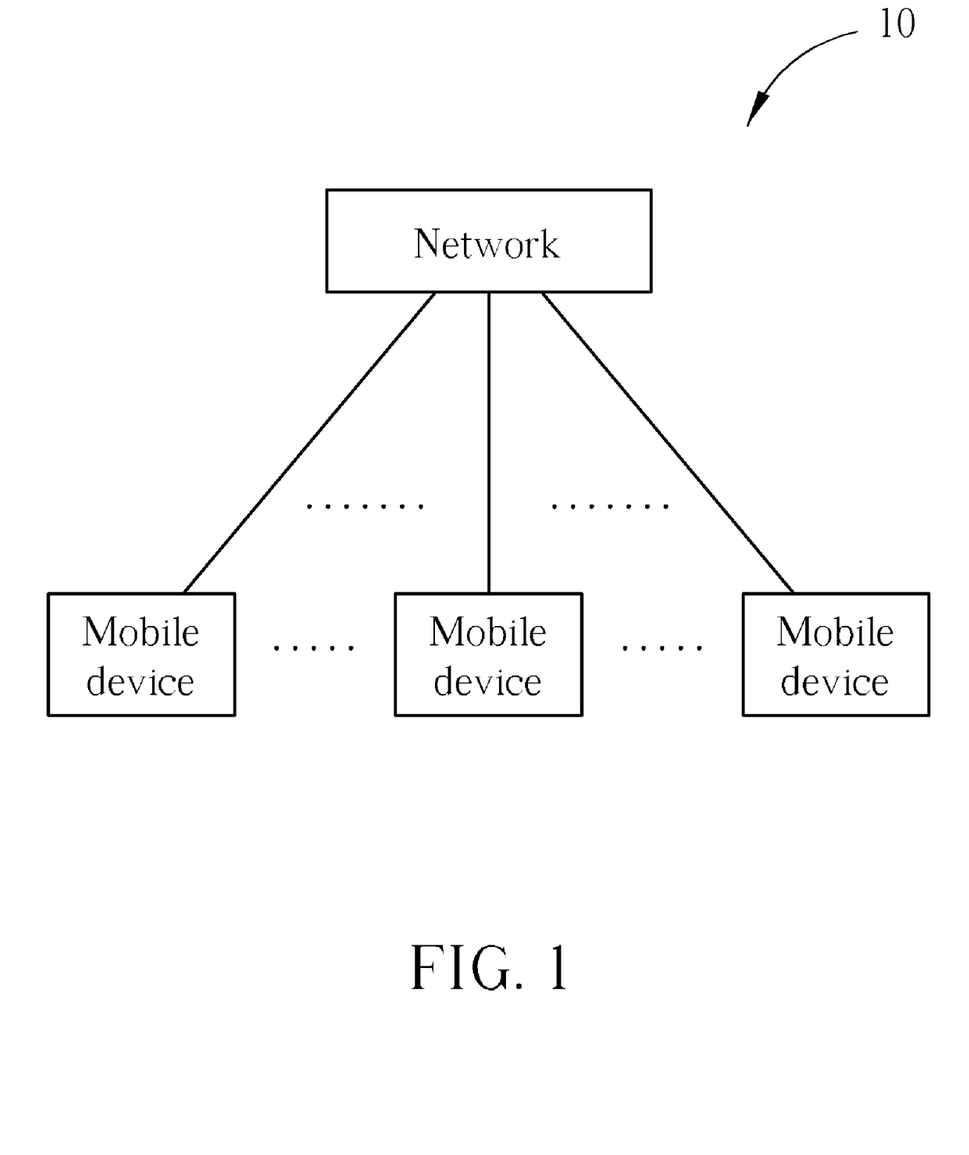
FIG. 1 illustrates a schematic diagram of an exemplary wireless communication system.

Please refer to FIG. 1, which illustrates a schematic diagram of a wireless communication system 10 according to an example. Briefly, the wireless communication system 10 is composed of a network and a plurality of mobile devices. The wireless communication system 10 can be a UMTS (Universal Mobile Telecommunications System), an LTE (long-term evolution) system or any other similar network system. In the LTE system, the network can be referred as a EUTRAN (evolved-UTRAN) comprising a plurality of eNBs or a core network entity (e.g. Mobility Management Entity called MME), whereas the mobile devices are referred as to user equipments (UEs). The UEs can be devices such as mobile phones, computer systems, etc. This terminology will be used throughout the application for ease of reference. However, this should not be construed as limiting the disclosure to any one particular type of network. In some examples, the network and the UE may be seen as a transmitter or receiver according to transmission direction, e.g., for uplink (UL), the UE is the transmitter and the network is the receiver, and for downlink (DL), the network is the transmitter and the UE is the receiver.

Figure 2:
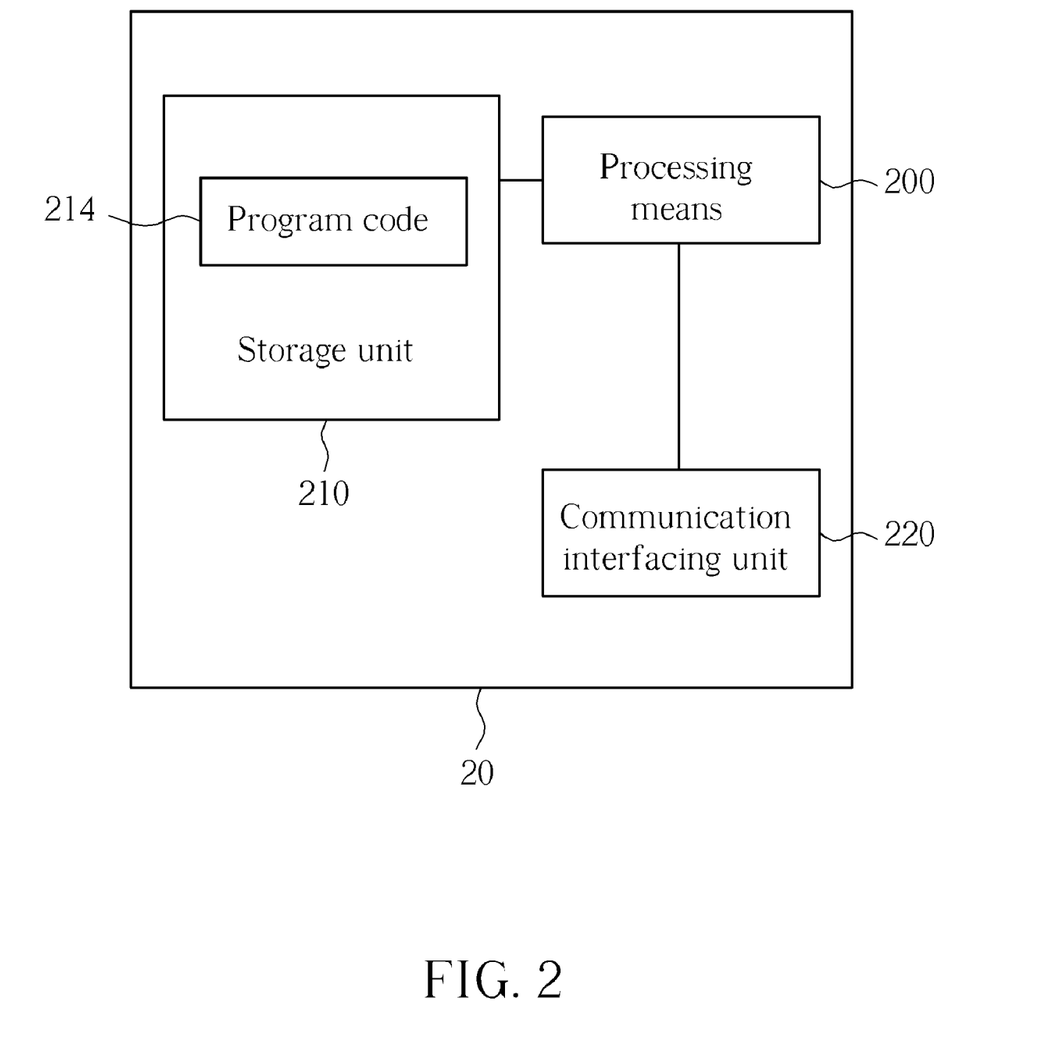
FIG. 2 illustrates a schematic diagram of an exemplary communication device.

FIG. 2 illustrates a schematic diagram of an exemplary communication device 20. The communication device 20 can be the mobile device 10 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 3:
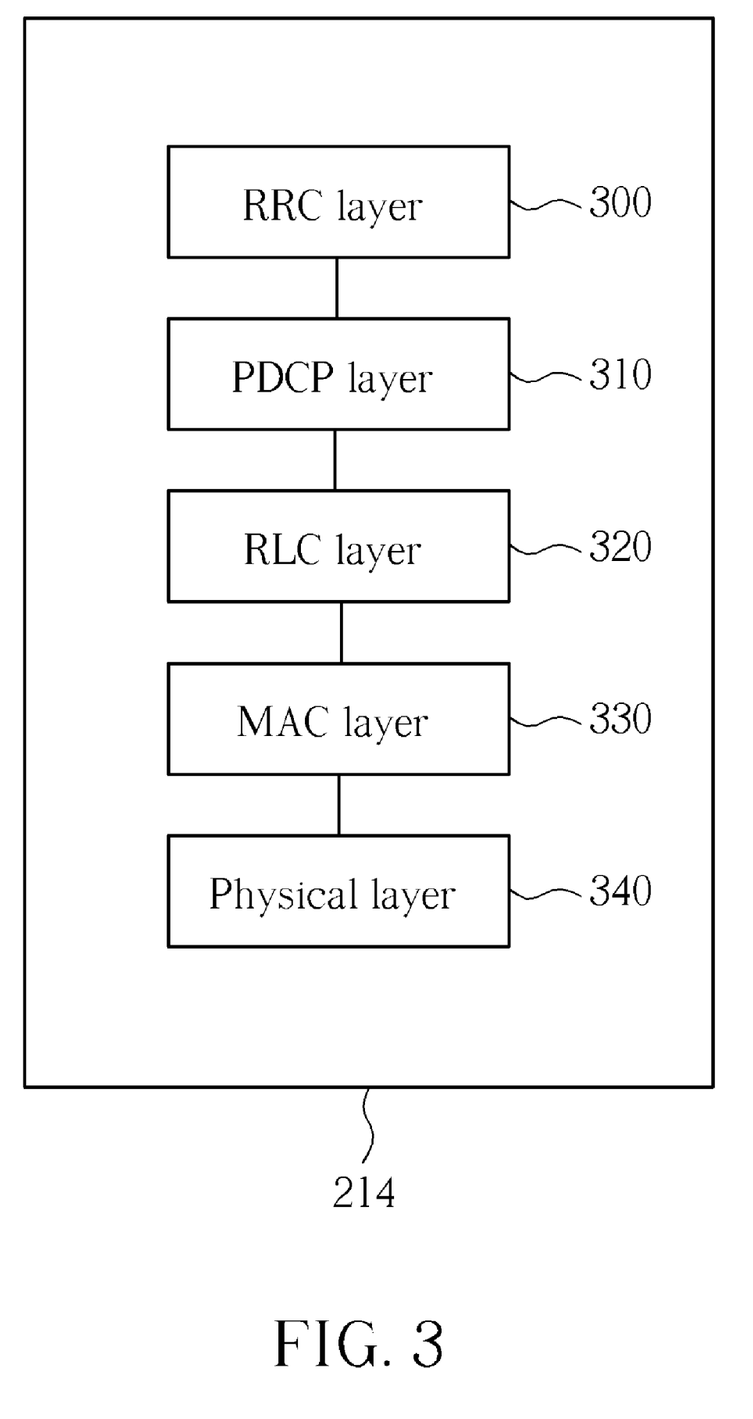
FIG. 3 illustrates a schematic diagram of communication protocol layers for an exemplary communication system.

Please refer to FIG. 3, which illustrates a schematic diagram of communication protocol layers for the LTE-Advanced system. The behaviors of some of the protocol layers may be defined in the program code 214 and executed by the processing means 200. The protocol layers from top to bottom are a radio resource control (RRC) layer 300, a packet data convergence protocol (PDCP) layer 310, a radio link control (RLC) layer 320, a medium access control (MAC) layer 330 and a physical (PHY) layer 340. The RRC layer 300 is used for performing RRC connection management, measurement reporting and control, mobility configuration, and radio bearer (RB) control responsible for generating or releasing radio bearers (RBs).

Figure 4:
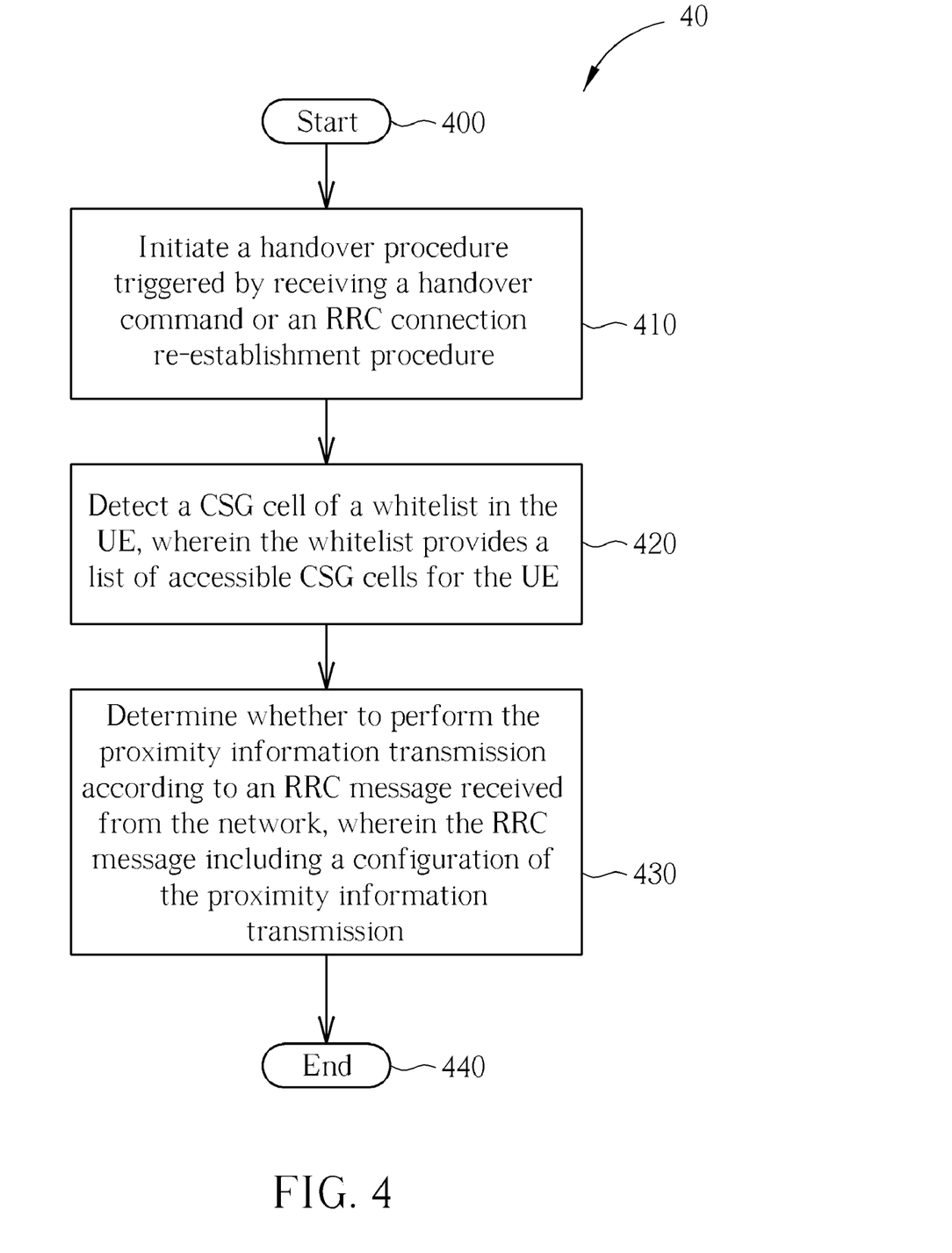
FIG. 4-6 are flowcharts of exemplary processes.

Please refer to FIG. 4, which illustrates a flowchart of an exemplary process 40. The process 40 is utilized in a UE, as the mobile device of FIG. 1, for handling proximity information transmission. The UE has a closed subscriber group (CSG) whitelist capable of providing a list of accessible CSG cells. The process 40 can be compiled into the program code 214 and includes the following steps:

Step 400: Start.

Step 410: Initiate a handover procedure triggered by receiving a handover command or an RRC connection re-establishment procedure.

Step 420: Detect a CSG cell of a whitelist in the UE, wherein the whitelist provides a list of accessible CSG cells for the UE.

Step 430: Determine whether to perform the proximity information transmission according to an RRC message received from the network, wherein the RRC message including a configuration of the proximity information transmission.

Step 440: End.

According to the process 40, whenever the handover triggered by a handover command received from the network, or the RRC connection re-establishment to a base station occurs, the UE determines whether to perform the proximity information transmission according to the configuration of the proximity information transmission in the RRC message though a CSG cell of the CSG whitelist is detected. More specifically, the UE transmits the proximity information to the base station when the RRC message configures transmission of the proximity information, after the handover or the RRC connection re-establishment is completely performed, whereas the UE does not transmit the proximity information to the base station when the RRC message configuring no transmission of the proximity information, after the handover or the RRC connection re-establishment is completely performed.

Please note that, the UE is allowed to transmit the proximity information to the base station when the RRC message configures transmission of the proximity information and the handover or the RRC connection re-establishment procedure is completely performed since the UE is prohibited to transmit the proximity information before a signaling radio bearer 2 (SRB2) is established. In addition, the RRC message may be an "RRCConnectionReconfiguration" message received right after the RRC connection re-establishment procedure is completely performed, an "RRCConnectionReconfiguration" message requesting the handover, or a handover command.

Take an example based on the process 40. The network (e.g. the E-UTRAN, or a source eNB) indicates support of inbound mobility by means of an "inboundHO-support" field in the "RRCConnectionReconfiguration" message. When the UE receives the "RRCConnectionReconfiguration" message including the "inboundHO-support" field indicating that the source eNB supports inbound mobility to CSG/hybrid cells, the UE knows the source eNB supports the inbound mobility, and thereby is allowed for proximity information transmission. The UE performs the RRC connection re-establishment procedure (e.g. due to a radio link failure, RLC unrecoverable error, MAC random access error) to a target eNB, and detects that it is close to a CSG cell in its CSG whitelist. The UE is configured to transmit the proximity information to the target eNB when a first "RRCConnectionReconfiguration" message received immediately following the RRC connection re-establishment procedure indicates that the target eNB supports inbound mobility to CSG cells (e.g. by means of the "inboundHO-support" field), and thereby transmits the proximity information to the target eNB after the RRC connection re-establishment procedure is completely performed. On the other hand, the UE is not configured to transmit the proximity information to the target eNB when the first "RRCConnectionReconfiguration" message received immediately following the RRC connection re-establishment procedure indicates that the target eNB does not support inbound mobility to CSG cells, and thereby does not transmit the proximity information to the target eNB after the RRC connection re-establishment procedure is completely performed. The concept can be applied to the handover procedure. The difference is that the UE determines whether to perform the proximity information transmission according to the handover command (e.g. by enabling/disabling the proximity information transmission) when the handover command is received from the network. The UE is configured to transmit the proximity information to the target eNB when the handover command enables the proximity information transmission, and performs the proximity information transmission after the handover procedure is completely performed. Otherwise, the UE is not configured to transmit the proximity information to the target eNB, and thereby does not perform the proximity information transmission after the handover procedure is completely performed. Briefly, the UE, which has been configured proximity information transmission by the source eNB, does not automatically transmit the proximity information to the target eNB after the UE completes the RRC connection re-establishment procedure or the handover procedure. In other words, after the UE completes the RRC connection re-establishment procedure or the handover procedure to the target eNB, the UE determines whether to transmit the proximity information to the target eNB according to the configuration of the proximity information transmission in the RRC message.

The process 40 clearly specifies how the UE shall deal with the proximity information transmission when the handover procedure or RRC connection re-establishment procedure occurs. The UE does not transmit the proximity information to the target eNB unless the UE is configured with the proximity information transmission. Therefore, when the UE transmits an "RRCConnectionReconfigurationRequest" message including the proximity information to the target eNB, the target eNB does not confused by the "RRCConnectionReconfigurationRequest" message, thereby avoiding system failure of the target eNB.

Figure 5:
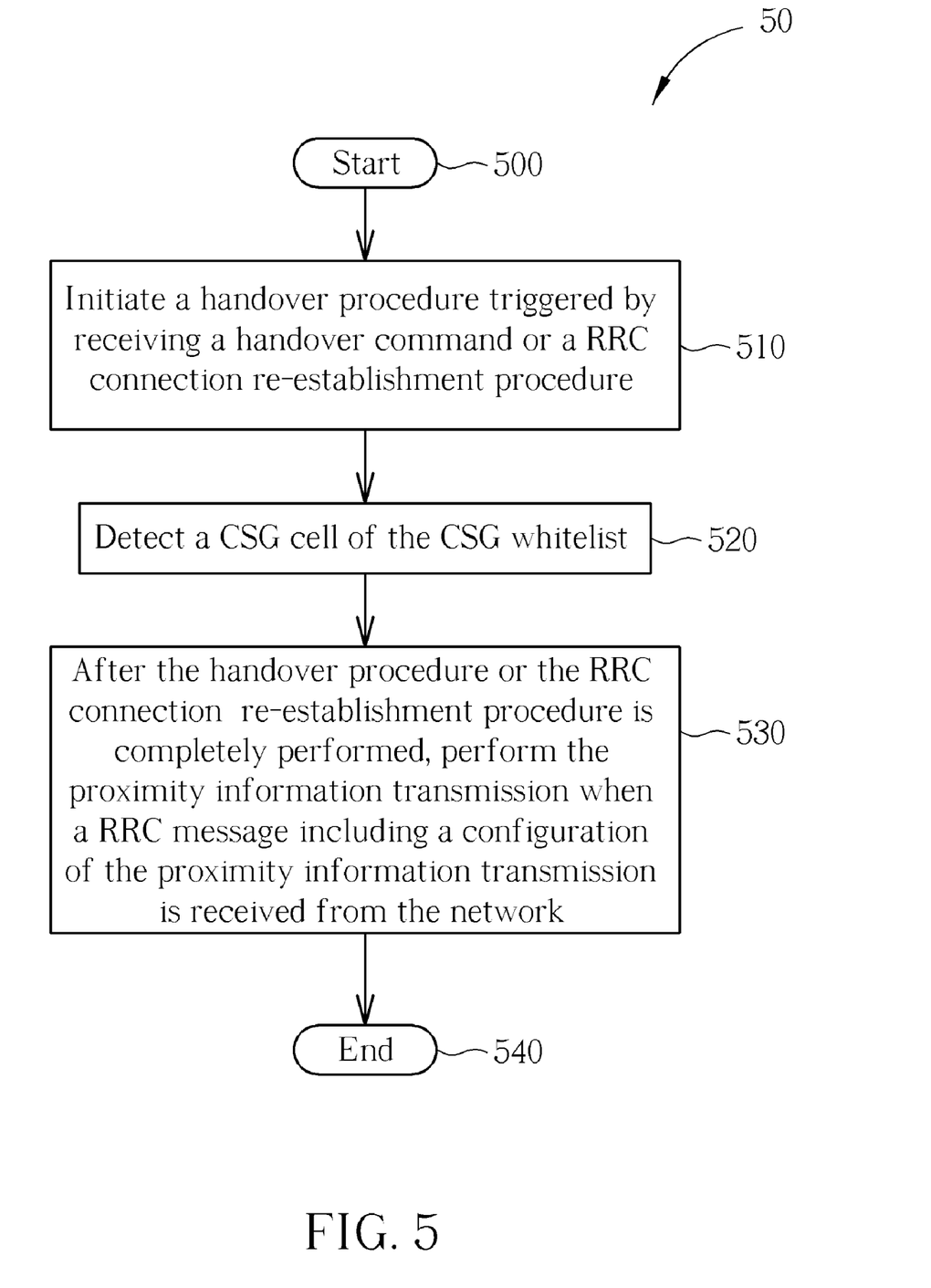

Please refer to FIG. 5, which illustrates a flowchart of an exemplary process 50. The process 50 is utilized in a UE, as the mobile device of FIG. 1, for handling proximity information transmission. The UE has a CSG whitelist capable of providing a list of accessible CSG cells. The process 50 can be compiled into the program code 214 and includes the following steps:

Step 500: Start.

Step 510: Initiate a handover procedure triggered by receiving a handover command or a RRC connection re-establishment procedure.

Step 520: Detect a CSG cell of the CSG whitelist.

Step 530: After the handover procedure or the RRC connection re-establishment procedure is completely performed, perform the proximity information transmission when a RRC message including a configuration of the proximity information transmission is received from the network.

Step 540: End.

According to the process 50, the UE performs the proximity information transmission when the RRC message configuring transmission of the proximity information is received, after the UE completes the handover or RRC connection re-establishment procedure (e.g. after the SRB2 is established). Otherwise, the UE does not perform the proximity information transmission after the UE completes the handover or RRC connection re-establishment procedure.

In addition, the RRC message may be an "RRCConnectionReconfiguration" message received right after the RRC connection re-establishment procedure is completely performed, an "RRCConnectionReconfiguration" message requesting the handover, or a handover command.

Take an example based on the process 50. The UE is configured with the proximity information transmission by the network (e.g. the E-UTRAN, or a source eNB). The UE performs the RRC connection re-establishment procedure to the target eNB, and detects that it is close to a CSG cell in its CSG whitelist. After the RRC connection re-establishment procedure is completely performed, the UE transmits the proximity information to the target eNB when a first "RRCConnectionReconfiguration" message immediately following the RRC connection re-establishment procedure and indicating that the target eNB supports inbound mobility to CSG cells is received from the network. The concept can be applied to the handover procedure also. The UE transmits the proximity information transmission to the target eNB when a handover command enabling the proximity information transmission is received from the network, after the handover procedure is completely performed.

Similar to the process 40, the UE does not automatically transmit the proximity information to the target eNB after the UE completes the handover or RRC connection re-establishment procedure unless the RRC message including the configuration of proximity information transmission is received from the network, thereby avoiding system failure of the target eNB.

Figure 6:
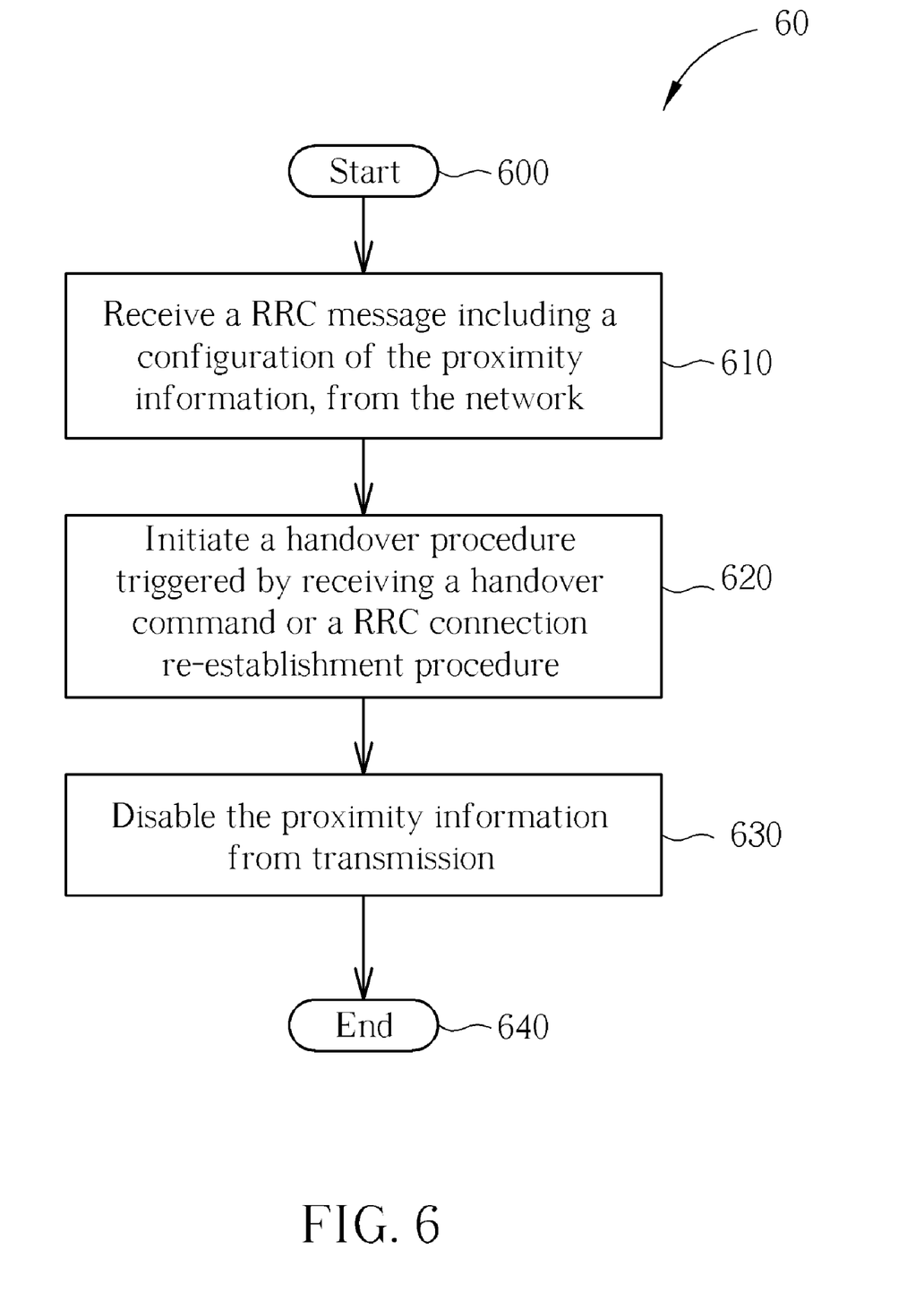

Please refer to FIG. 6, which illustrates a flowchart of an exemplary process 60. The process 60 is utilized in a UE, as the mobile device of FIG. 1, for handling proximity information transmission. The UE has a CSG whitelist capable of providing a list of accessible CSG cells. The process 60 can be compiled into the program code 214 and includes the following steps:

Step 600: Start.

Step 610: Receive a RRC message including a configuration of the proximity information, from the network.

Step 620: Initiate a handover procedure triggered by receiving a handover command or a RRC connection re-establishment procedure.

Step 630: Disable the proximity information from transmission.

Step 640: End.

According to the process 60, the UE disables transmission of the proximity information during the RRC connection re-establishment procedure or the handover procedure. That is, the UE does not perform the proximity information transmission when the handover procedure (e.g. upon reception of the handover command from the network) or the RRC connection re-establishment procedure (e.g. upon initiation of the RRC connection re-establishment procedure) is not completely performed.

Take an example based on the process 60. The UE receives a RRC message (e.g. the "RRCConnectionReconfiguration" message) including a configuration of the proximity information transmission, from the network (e.g. the E-UTRAN or the source eNB). The UE performs the handover procedure or the RRC connection re-establishment procedure to the target eNB, and detects that it is close to a CSG cell in its CSG whitelist. The UE disables the proximity information transmission when the handover procedure or the RRC connection re-establishment procedure is still performed. That is, the UE releases the configuration of the proximity information transmission. Therefore, the UE does not transmit the proximity information to the target eNB during a period of the handover procedure or the RRC connection re-establishment procedure, so as to avoid confusing the target eNB and causing system failure.

In addition, the UE may perform the proximity information transmission to the target eNB according to the process 40 or 50 after the handover procedure or the RRC connection re-establishment procedure is completely performed.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the exemplary examples and means are provided for handling the proximity information transmission for the UE configured proximity information transmission when the connection transfer occurs, so as to make a correct transmission of the proximity information.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling proximity information transmission for a mobile device in a wireless communication system, the method comprising:

initiating a handover procedure triggered by receiving a handover command or an radio resource control (RRC) connection re-establishment procedure;

detecting a closed subscriber group (CSG) cell of a whitelist in the mobile device, wherein the whitelist provides a list of accessible CSG cells for the mobile device; and determining whether to perform the proximity information transmission according to an RRC message received from a network of the wireless communication system, wherein the RRC message includes a configuration of the proximity information transmission, wherein the RRC message is an RRCConnectionReconfiguration message received right after the RRC connection re-establishment procedure is completely performed, or an RRCConnectionReconfiguration message requesting the handover.

2. The method of claim 1, wherein determining whether to perform the proximity information transmission according to the RRC message received from the network of the wireless communication system comprises:

after the handover procedure or the RRC connection re-establishment procedure is completely performed, performing the proximity information transmission when the RRC message configures transmission of the proximity information.

3. The method of claim 1, wherein determining whether to perform the proximity information transmission according to the RRC message received from the network of the wireless communication system comprises:

after the handover procedure or the RRC connection re-establishment procedure is completely performed, determining not to perform the proximity information transmission when the RRC message configures no transmission of the proximity information.

4. A method of handling proximity information transmission for a mobile device in a wireless communication system, the method comprising:

initiating a handover procedure triggered by receiving a handover command or a radio resource control (RRC) connection re-establishment procedure;

detecting a closed subscriber group (CSG) cell of a whitelist in the mobile device, wherein the whitelist provides a list of accessible CSG cells for the mobile device; and after the handover procedure or the RRC connection re-establishment procedure is completely performed, performing the proximity information transmission when a RRC message including a configuration of the proximity information transmission is received from a network of the wireless communication system, wherein the RRC message is an RRCConnectionReconfiguration message received right after the RRC connection re-establishment procedure is completely performed, or an RRCConnectionReconfiguration message requesting the handover.

5. A method of handling proximity information transmission for a mobile device in a wireless communication system, the method comprising:

receiving a radio resource control (RRC) message including a configuration of the proximity information, from a network of the wireless communication system;

initiating a handover procedure triggered by receiving a handover command, or a RRC connection re-establishment procedure; and disabling the proximity information from transmission, wherein disabling the proximity information from transmission comprises releasing the configuration of the proximity information transmission included in the RRC message that is an RRCConnectionReconfiguration message received before the handover procedure or the RRC connection re-establishment procedure.

6. A mobile device of a wireless communication system for handling proximity information transmission, comprising:

means for initiating a handover procedure triggered by receiving a handover command or an radio resource control (RRC) connection re-establishment procedure;

means for detecting a closed subscriber group (CSG) cell of a whitelist in the mobile device, wherein the whitelist provides a list of accessible CSG cells for the mobile device; and means for determining whether to perform the proximity information transmission according to an RRC message received from a network of the wireless communication system, wherein the RRC message includes a configuration of the proximity information transmission, wherein the RRC message is an RRCConnectionReconfiguration message received right after the RRC connection re-establishment procedure is completely performed, or an RRCConnectionReconfiguration message requesting the handover.

7. The mobile device of claim 6, wherein the means for determining whether to perform the proximity information transmission according to the RRC message received from the network of the wireless communication system comprises:

after the handover procedure or the RRC connection re-establishment procedure is completely performed, means for performing the proximity information transmission when the RRC message configures transmission of the proximity information.

8. The mobile device of claim 6, wherein the means for determining whether to perform the proximity information transmission according to the RRC message received from the network of the wireless communication system comprises:

after the handover procedure or the RRC connection re-establishment procedure is completely performed, means for determining not to perform the proximity information transmission when the RRC message configures no transmission of the proximity information.

9. A mobile device of a wireless communication system for handling proximity information transmission, comprising:

means for initiating a handover procedure triggered by receiving a handover command or a radio resource control (RRC) connection re-establishment procedure;

means for detecting a closed subscriber group (CSG) cell of a whitelist in the mobile device, wherein the whitelist provides a list of accessible CSG cells for the mobile device; and after the handover procedure or the RRC connection re-establishment procedure is completely performed, means for performing the proximity information transmission when a RRC message including a configuration of the proximity information transmission is received from a network of the wireless communication system, wherein the RRC message is an RRCConnectionReconfiguration message received right after the RRC connection re-establishment procedure is completely performed, or an RRCConnectionReconfiguration message requesting the handover.

10. A mobile device of a wireless communication system for handling proximity information transmission, comprising:

means for receiving a radio resource control (RRC) message including a configuration of the proximity information, from a network of the wireless communication system;

means for initiating a handover procedure triggered by receiving a handover command, or a RRC connection re-establishment procedure; and means for disabling the proximity information from transmission, wherein the means for disabling the proximity information from transmission comprises means for releasing the configuration of the proximity information transmission included in the RRC message that is an RRCConnectionReconfiguration message received before the handover procedure or the RRC connection re-establishment procedure.

* * * * *